United States Patent
Lin et al.

(10) Patent No.: US 12,517,605 B2
(45) Date of Patent: Jan. 6, 2026

(54) TOUCH CONTROL SYSTEM

(71) Applicant: Himax Technologies Limited, Tainan (TW)

(72) Inventors: Chang-Hui Lin, Tainan (TW); Yaw-Guang Chang, Tainan (TW); Jia-Ming He, Tainan (TW)

(73) Assignee: Himax Technologies Limited, Tainan (TW)

( * ) Notice: Subject to any disclaimer, the term of this patent is extended or adjusted under 35 U.S.C. 154(b) by 94 days.

(21) Appl. No.: 18/398,180

(22) Filed: Dec. 28, 2023

(65) Prior Publication Data

US 2025/0216965 A1 Jul. 3, 2025

(51) Int. Cl.
    *G06F 3/041* (2006.01)
    *G06F 3/044* (2006.01)
    *H03M 1/12* (2006.01)

(52) U.S. Cl.
    CPC .......... *G06F 3/0416* (2013.01); *G06F 3/0445* (2019.05); *H03M 1/12* (2013.01)

(58) Field of Classification Search
CPC .... G06F 3/0416; G06F 3/0445; G06F 3/0446; G06F 3/04166; H03M 1/12
See application file for complete search history.

(56) References Cited

U.S. PATENT DOCUMENTS

| | | | | |
|---|---|---|---|---|
| 2011/0084857 A1* | 4/2011 | Marino | ................ | G06F 3/0446 341/5 |
| 2015/0177881 A1* | 6/2015 | Chen | ................... | G06F 3/04166 345/174 |
| 2016/0062547 A1* | 3/2016 | Hong | ..................... | G05B 15/02 345/173 |
| 2017/0168642 A1* | 6/2017 | Lee | ......................... | G06F 3/047 |
| 2021/0081070 A1 | 3/2021 | Kang et al. | | |
| 2023/0079469 A1 | 3/2023 | Chang et al. | | |
| 2023/0176688 A1 | 6/2023 | Kim et al. | | |

OTHER PUBLICATIONS

Extended European Search Report dated Mar. 19, 2025 in related European Application No. 24208140.4.
Office Action dated Jul. 28, 2025 in corresponding Taiwan Patent Application No. 113140268.
Office Action dated Sep. 25, 2025 in corresponding Taiwan Patent Application No. 113140268.

* cited by examiner

*Primary Examiner* — Abhishek Sarma
(74) *Attorney, Agent, or Firm* — Donald E. Stout; Stout, Uxa & Buyan, LLP

(57) ABSTRACT

A touch control system includes a touch panel composed of a plurality of transmit lines and a plurality of receive lines; a transmitter that transmits at least one transmit signal to corresponding transmit line; a receiver that receives at least one receive signal from corresponding receive line; and a non-tapered continuous wave generator that generates a non-tapered continuous wave signal as a transmit signal for the transmitter.

13 Claims, 5 Drawing Sheets

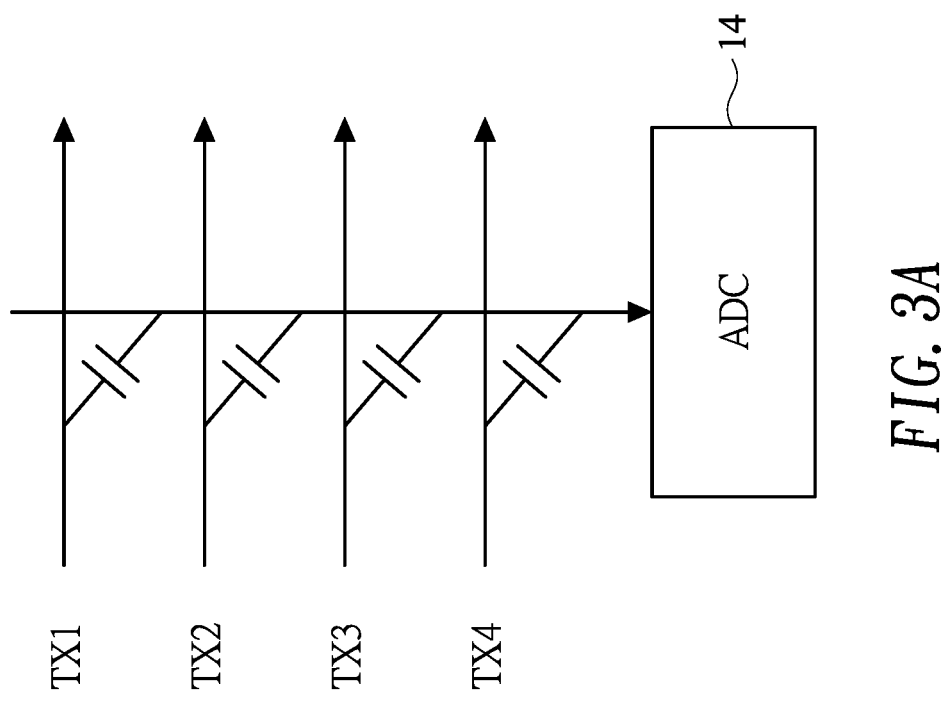

TOUCH CONTROL SYSTEM

BACKGROUND OF THE INVENTION

1. Field of the Invention

The present invention generally relates to a touch control system, and more particularly to a touch control system using a non-tapered continuous wave signal as a transmit signal.

2. Description of Related Art

A touch panel is a sensor device that is used to detect touch inputs on a display screen. Touch panels are used in a wide range of devices, such as smartphones, tablets, laptops, and other electronic devices.

There are several types of touch panels, including resistive, capacitive, and infrared touch panels. Resistive touch panels work by detecting pressure on the screen. They consist of two layers of conductive material separated by a small gap. When pressure is applied to the screen, the two layers come into contact, and the location of the touch is detected.

Capacitive touch panels work by detecting changes in capacitance. They consist of a layer of glass or plastic coated with a transparent conductor such as indium tin oxide (ITO). When a finger touches the screen, it changes the electrical field on the surface of the screen, and this change is detected by sensors located at the corners of the screen.

Infrared touch panels work by detecting interruptions in an infrared light grid. They consist of a grid of infrared light-emitting diodes (LEDs) and sensors located around the edge of the screen. When a finger touches the screen, it interrupts the infrared light grid, and this interruption is detected by the sensors.

Electromagnetic interference (EMI) can negatively impact the performance of touch panels. EMI can be caused by a variety of sources, such as radio frequency (RF) signals, power lines, and other electronic devices.

Capacitive touch panels, which are commonly used in smartphones and other portable devices, are particularly susceptible to EMI. Therefore, a need has arisen to propose a novel scheme to mitigate the effects of electromagnetic interference (EMI) on the touch panels.

SUMMARY OF THE INVENTION

In view of the foregoing, it is an object of the embodiment of the present invention to provide a touch control system that utilizes a non-tapered continuous wave signal as a transmit signal to effectively mitigate the effects of electromagnetic interference (EMI) on the touch control system.

According to one embodiment, a touch control system includes a touch panel, a transmitter, a receiver and a non-tapered continuous wave generator. The touch panel is composed of a plurality of transmit lines and a plurality of receive lines. The transmitter transmits at least one transmit signal to corresponding transmit line, and the receiver receives at least one receive signal from corresponding receive line. The non-tapered continuous wave generator generates a non-tapered continuous wave signal as a transmit signal for the transmitter.

BRIEF DESCRIPTION OF THE DRAWINGS

FIG. 3A shows a simplified block diagram illustrating a multi-touch detecting method that uses multi-tone non-tapered continuous wave signals according to one embodiment of the present invention;

DETAILED DESCRIPTION OF THE INVENTION

Figure 1:
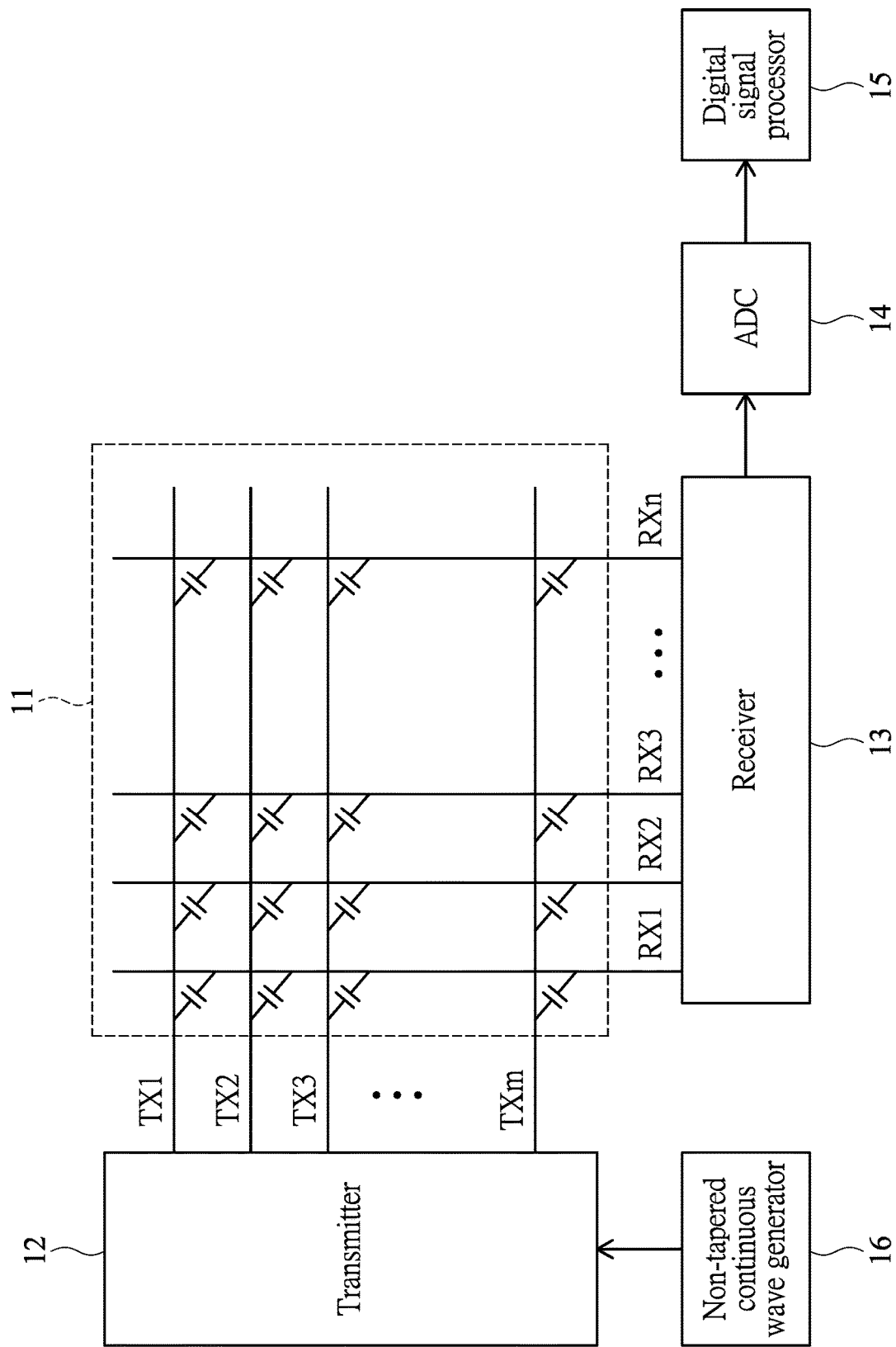
FIG. 1 shows a block diagram illustrating a touch control system according to one embodiment of the present invention.

FIG. 1 shows a block diagram illustrating a touch control system 100 according to one embodiment of the present invention.

In the embodiment, the touch control system 100 may include a touch panel 11 composed of a plurality of transmit lines TX1-TXm disposed on a first layer and a plurality of receive lines RX1-RXn disposed on a second layer. There are capacitors respectively located at intersections of the transmit lines TX1-TXm and the receive lines RX1-RXn for detecting a touch position (i.e., single-touch) or multiple touch positions (i.e., multi-touch). In the embodiment, the touch panel 11 may be a capacitive touch panel, which determines touch position(s) by detecting capacitance changes in the capacitors. Although a capacitive touch panel is exemplified, it is appreciated that the embodiment may be applied to other types of touch panels.

The touch control system 100 may include a transmitter 12 configured to output (or transmit) at least one transmit signal (at a time) to corresponding transmit line TX1-TXm. The touch control system 100 may include a receiver 13 configured to input (or receive) at least one receive signal (at a time) from corresponding receive line RX1-RXn.

The touch control system 100 of the embodiment may include an analog-to-digital converter (ADC) 14 configured to convert an analog receive signal (from the receiver 13) into a digital signal that can be processed by a digital signal processor 15.

According to one aspect of the embodiment, the touch control system 100 may include a non-tapered continuous wave generator 16 configured to generate a non-tapered continuous (basic) wave signal as the transmit signal for the transmitter 12. Although sine wave signal will be exemplified in the following embodiment, it is appreciated that other basic wave signals, such as square wave signal or triangle wave signal, may be used instead.

Figure 2A:
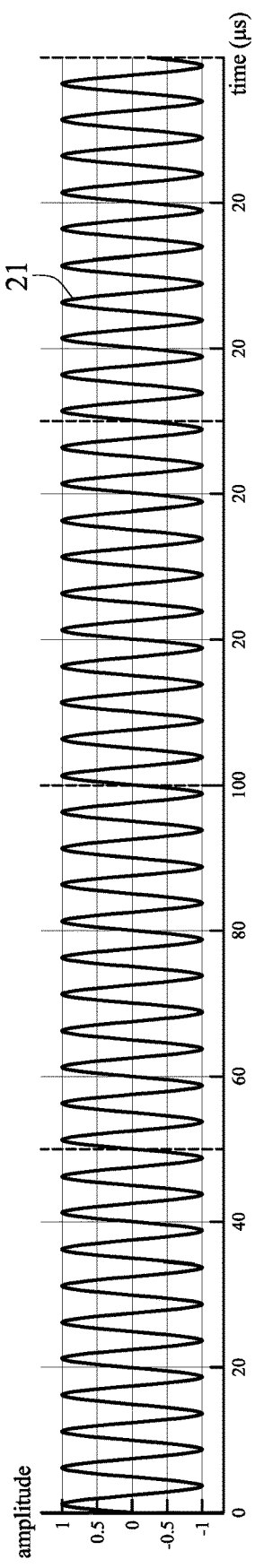
FIG. 2A shows an exemplary timing diagram of a non-tapered continuous sine wave signal according to one embodiment of the present invention.
Figure 2B:
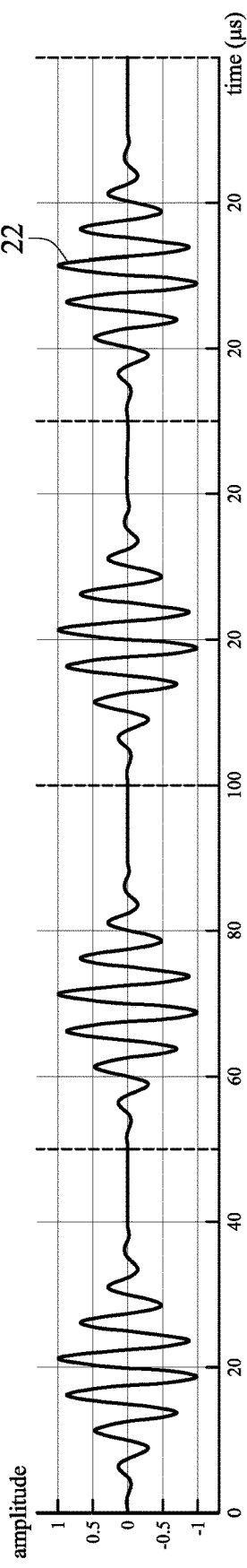
FIG. 2B shows a timing diagram of a tapered wave signal as conventionally used as a transmit signal.
Figure 2C:
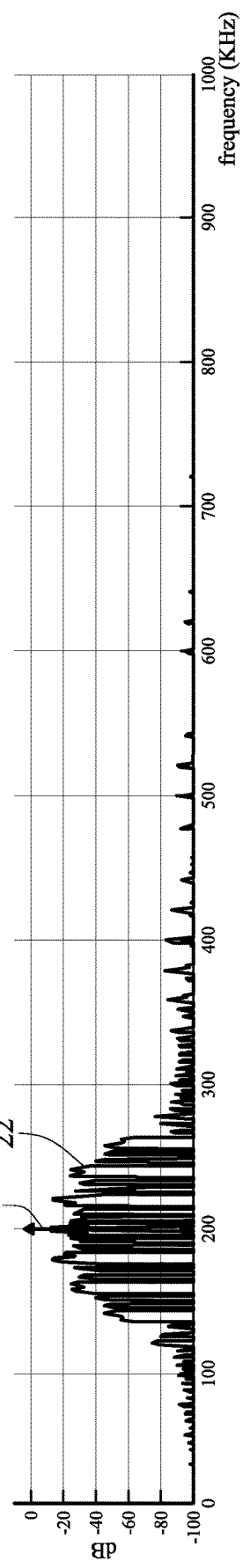
FIG. 2C shows a spectrum diagram of the non-tapered continuous sine wave signal (of FIG. 2A) and the tapered wave signal (of FIG. 2B)

FIG. 2A shows an exemplary timing diagram of a non-tapered continuous sine wave signal 21 according to one embodiment of the present invention. In contrast, FIG. 2B shows a timing diagram of a tapered wave signal 22 as conventionally used as a transmit signal. The tapered wave signal 22 may, for example, be generated by subjecting a sine wave signal to (or multiplied by) a window function that tapers the sine wave signal to zero at both ends to result in the tapered (or windowed) wave signal 22. FIG. 2C shows a spectrum diagram of the non-tapered continuous sine wave signal 21 (of FIG. 2A) and the tapered wave signal 22 (of FIG. 2B). As the bandwidth of the non-tapered continuous sine wave signal 21 is substantially smaller than the bandwidth of the tapered wave signal 22, it is evident that the non-tapered continuous sine wave signal 21 as utilized in the embodiment can effectively mitigate the effects of electromagnetic interference (EMI) on the touch control system 100.

Figure 3B:
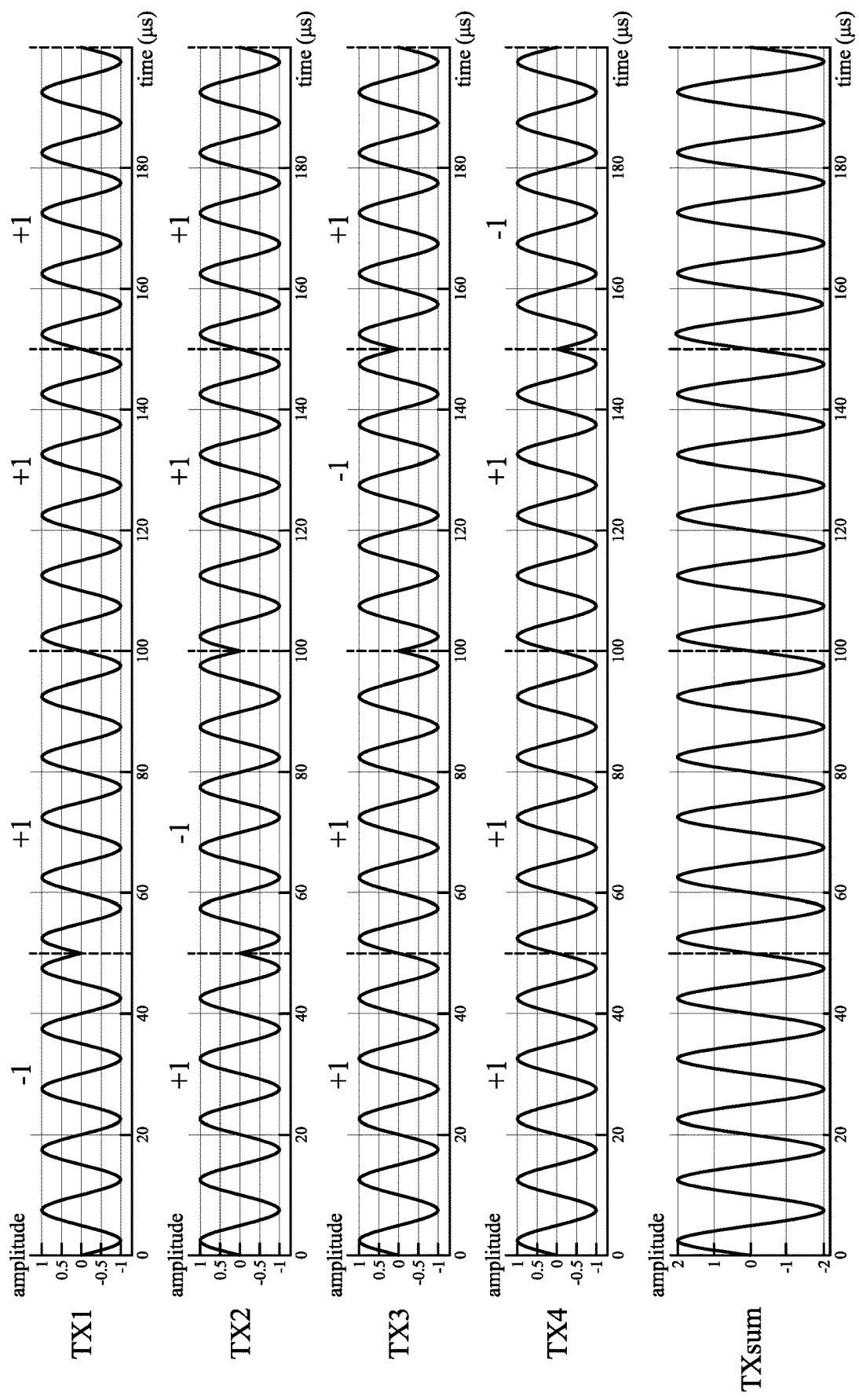
FIG. 3B shows timing diagrams exemplifying the multi-tone non-tapered continuous wave signals of FIG. 3A.

FIG. 3A shows a simplified block diagram illustrating a multi-touch detecting method that uses multi-tone non-tapered continuous wave signals according to one embodiment of the present invention, and FIG. 3B shows timing diagrams exemplifying the multi-tone non-tapered continuous wave signals of FIG. 3A. In the embodiment, the transmitter 12 transmits encoded non-tapered continuous (e.g., sine) wave signals simultaneously via transmit lines TX1-TX4. Specifically, for example, the transmit line TX1 transmits encoded non-tapered continuous wave signals [−1 +1 +1 +1] in sequence, the transmit line TX2 transmits encoded non-tapered continuous wave signals [+1 −1 +1 +1] in sequence, the transmit line TX3 transmits encoded non-tapered continuous wave signals [+1 +1 −1 +1] in sequence, and the transmit line TX4 transmits encoded non-tapered continuous wave signals [+1 +1 +1 −1] in sequence. It is noted that the encoded non-tapered continuous wave signal "+1" has a phase opposite to (or 180 degrees different from) that of the encoded non-tapered continuous wave signal "−1." All encoded non-tapered continuous wave signals (via transmit lines TX1-TX4) are combined to form a non-tapered continuous wave sum signal TXsum, which possess narrow spectrum bandwidth similar to the non-tapered continuous sine wave signal 21 shown in FIG. 2C. Therefore, electromagnetic interference (EMI) can be effectively reduced.

In an alternative embodiment, a multi-touch detecting method uses non-tapered continuous wave signals that are multi-tone (as in FIG. 3A/3B) and are also multi-frequency. For example, a first set of encoded non-tapered continuous wave signals with a first frequency are transmitted via transmit lines TX1-TX4, and a second set of encoded non-tapered continuous wave signals with a second frequency are transmitted via transmit lines TX5-TX8 (not shown).

Figure 4:
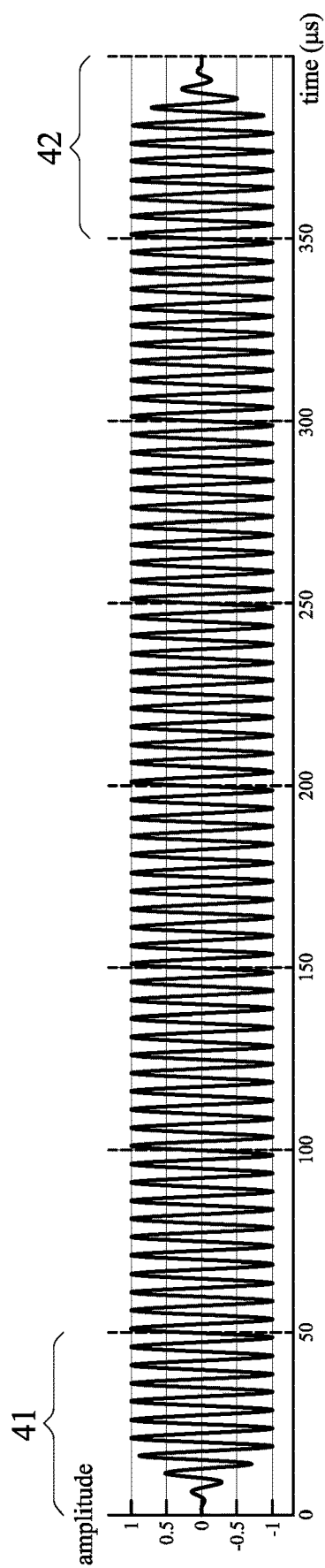
FIG. 4 shows an exemplary timing diagram illustrating a series of non-tapered continuous (sine) wave signals according to one embodiment of the present invention.

FIG. 4 shows an exemplary timing diagram illustrating a series of non-tapered continuous (sine) wave signals according to one embodiment of the present invention. In the embodiment, a start of a first non-tapered continuous wave signal 41 (of the series) and an end of a last non-tapered continuous wave signal 42 (of the series) may be tapered by a window function that is capable of tapering a signal at only one end. The first continuous wave signal 41 with a tapered start is used when starting signal transmitting, and the last continuous wave signal 41 with a tapered end is used when terminating signal transmitting.

Although specific embodiments have been illustrated and described, it will be appreciated by those skilled in the art that various modifications may be made without departing from the scope of the present invention, which is intended to be limited solely by the appended claims.

What is claimed is:

1. A touch control system, comprising:
   a touch panel composed of a plurality of transmit lines and a plurality of receive lines;
   a transmitter that transmits at least one transmit signal to corresponding transmit line;
   a receiver that receives at least one receive signal from corresponding receive line; and
   a non-tapered continuous wave generator that generates a non-tapered continuous wave signal as a transmit signal for the transmitter;
   wherein the transmit signal is a non-windowed signal without zero blanking when a phase of the transmit signal is inverted.

2. The system of claim 1, wherein the plurality of transmit lines are disposed on a first layer, and the plurality of receive lines are disposed on a second layer.

3. The system of claim 1, wherein the touch panel comprises a capacitive touch panel.

4. The system of claim 3, wherein the touch panel comprises a plurality of capacitors respectively located at intersections of the plurality of transmit lines and the plurality of receive lines.

5. The system of claim 1, further comprising:
   an analog-to-digital converter (ADC) that converts an analog receive signal into a digital signal.

6. The system of claim 5, further comprising:
   a digital signal processor that processes the digital signal from the ADC.

7. The system of claim 1, wherein the non-tapered continuous wave signal comprises a sine wave signal, a square wave signal or a triangle wave signal.

8. The system of claim 1, wherein bandwidth of the non-tapered continuous wave signal is substantially smaller than bandwidth of a tapered wave signal that is generated by subjecting a wave signal to a window function that tapers the wave signal to zero at both ends.

9. The system of claim 1, wherein the transmitter transmits a plurality of encoded non-tapered continuous wave signals simultaneously via the plurality of transmit lines.

10. The system of claim 9, wherein the plurality of encoded non-tapered continuous wave signals are combined to form a non-tapered continuous wave sum signal.

11. The system of claim 9, wherein the plurality of encoded non-tapered continuous wave signals comprise at least two sets of encoded non-tapered continuous wave signals with different frequencies.

12. The system of claim 1, wherein the transmitter transmits a series of non-tapered continuous wave signals, of which a start of a first non-tapered continuous wave signal and an end of a last non-tapered continuous wave signal are tapered, wherein the first continuous wave signal with a tapered start is used when starting signal transmitting, and the last continuous wave signal with a tapered end is used when terminating signal transmitting.

13. The system of claim 12, wherein the start of the first non-tapered continuous wave signal and the end of the last non-tapered continuous wave signal are tapered by a window function that is capable of tapering a signal at only one end.

* * * * *